(12) United States Patent
Pistol

(10) Patent No.: US 10,389,096 B2
(45) Date of Patent: Aug. 20, 2019

(54) CABLE MANAGEMENT SYSTEMS AND METHODS

(71) Applicant: HD Products, LLC, Centennial, CO (US)

(72) Inventor: James Pistol, Highlands Ranch, CO (US)

(73) Assignee: HD Products, LLC, Centennial, CO (US)

( * ) Notice: Subject to any disclaimer, the term of this patent is extended or adjusted under 35 U.S.C. 154(b) by 0 days.

(21) Appl. No.: 15/956,574

(22) Filed: Apr. 18, 2018

(65) Prior Publication Data

US 2018/0309280 A1    Oct. 25, 2018

Related U.S. Application Data

(60) Provisional application No. 62/488,563, filed on Apr. 21, 2017.

(51) Int. Cl.

| H02G 15/10 | (2006.01) |
| H02G 3/08 | (2006.01) |
| H02G 3/38 | (2006.01) |
| H02G 3/12 | (2006.01) |
| H02G 3/36 | (2006.01) |

(52) U.S. Cl.
CPC ............. *H02G 3/121* (2013.01); *H02G 3/083* (2013.01); *H02G 3/288* (2013.01); *H02G 3/36* (2013.01); *H02G 15/10* (2013.01)

(58) Field of Classification Search
None
See application file for complete search history.

(56) References Cited

U.S. PATENT DOCUMENTS

| D487,726 S | * | 3/2004 | Okuda | .................... D13/156 |
| D593,505 S | * | 6/2009 | Fimbres | .................. D13/156 |
| 8,563,876 B1 | | 10/2013 | Gretz | |
| 8,658,895 B1 | | 2/2014 | Gretz | |
| 8,802,985 B2 | * | 8/2014 | Lettkeman | ............... H02G 1/00 |
| | | | | 174/66 |
| 8,975,518 B1 | | 3/2015 | Gretz | |
| 9,184,579 B2 | * | 11/2015 | Callahan | .................. H02G 3/12 |
| 9,318,888 B1 | | 4/2016 | Baldwin et al. | |

(Continued)

OTHER PUBLICATIONS

Midlite Power Jumper, http://www.midlite.com/data/brochures/22APJW-7R.pdf.

(Continued)

*Primary Examiner* — Dimary S Lopez Cruz
(74) *Attorney, Agent, or Firm* — Adsero IP

(57) ABSTRACT

A cable management system including an inlet junction box, an outlet junction box, and a power bridge cable extending between the junction boxes. The power bridge cable extends between the junction boxes within a wall and provides for power to be supplied from the inlet junction box to the outlet junction box. A permanent electrical connection is typically provided between the power bridge cable and power sockets at the outlet junction box. A removeable power bridge plug is provided at the opposite end of the power bridge cable for removeable connection to male power plugs at inlet junction box, thus placing the outlet power sockets and the inlet power plugs into electrical communication with each other.

14 Claims, 5 Drawing Sheets

(56) References Cited

U.S. PATENT DOCUMENTS

| | | | |
|---|---|---|---|
| 9,531,177 B1 * | 12/2016 | Gretz | H01R 27/02 |
| 10,128,646 B1 * | 11/2018 | Gretz | H02G 3/123 |
| 2002/0058433 A1 * | 5/2002 | O'Malley | H01R 13/443 |
| | | | 439/148 |
| 2003/0124900 A1 | 7/2003 | O'Malley | |

OTHER PUBLICATIONS

Home Depot, http://www.homedepot.com/p/CE-TECH-In-Wall-Power-Cord-and-Cable-Kit-A32-KW/204412643.
Arlington TV Bridge, http://www.aifittings.com/catalog/home-theater-audio-video/tv-bridge-ii-kits/.

* cited by examiner

CABLE MANAGEMENT SYSTEMS AND METHODS

RELATED APPLICATIONS

This application claims the benefit of U.S. Provisional Application Ser. No. 62/488,563, filed Apr. 21, 2017, which is incorporated herein by reference in its entirety.

TECHNICAL FIELD

The present disclosure is directed toward a cable management system, various components for a cable management system and method of managing cables.

BACKGROUND

It is common for homeowners to mount a flat-panel television, large computer monitor, electric fireplace or other electrical appliance to a wall in a viewing room. These and similar appliances are collectively referred to as "televisions" herein for convenience. Power is typically supplied to a television through a conventional power cord. Audio and visual signals can be provided to the television through one or more audiovisual cables. In addition, data cables of various types may terminate at the television.

When a television is wall-mounted, it is possible that the owner will simply allow the necessary power, audiovisual, and data cables to extend or drop along the wall supporting the television. These cables may then be connected to the appropriate power outlet, cable outlet, data port, audiovisual component or other appropriate termination. Allowing all of the cabling leading to or from a wall-mounted television to simply hang along the surface of a wall is unsightly and untidy. Therefore, many homeowners will desire to have some or all cabling to or from a television concealed within the wall behind the television. The cables may then exit the wall at an unobtrusive location and be attached to the appropriate termination. If the cables extending to or from a television are concealed within the relevant wall(s), the television can be attached to the wall without any cables or wires visibly showing, which presents a very tidy and uncluttered appearance.

In a new-construction implementation, appropriate cables can be included inside the wall as it is being built and terminated at appropriate junction boxes. For example, cables and junction boxes can be installed after the wall is framed, but before drywall is attached to the framing. In an existing-construction implementation however, it is typically necessary to add junction boxes and to pull the appropriate cables from an opening in the wall generally located behind the television to a second opening in the wall typically located at a lower, unobtrusive position. It can be very difficult for a homeowner to pull cables through existing walls. Furthermore, it can be difficult for a homeowner to make the electrical connections required at the outlet and lower junction boxes without violating applicable electrical codes or creating a fire hazard.

The present embodiments described herein are intended to overcome one or more of the problems discussed above.

SUMMARY

A first embodiment disclosed herein is a cable management system including an inlet junction box, an outlet junction box, and a power bridge cable which can be made to extend between the outlet junction box and the inlet junction box. In use, the outlet junction box will be positioned at an opening in a wall behind an appliance such as a wall-mounted television. The inlet junction box will typically be positioned at a second opening in the wall, below the outlet junction box in an unobtrusive location. The power bridge cable extends between the junction boxes within the wall and provides for power to be supplied from the inlet junction box to the outlet junction box and then to the television. The disclosed embodiments include several unique features for safely and conveniently making the necessary mechanical and electrical connections between system elements.

One embodiment of cable management system includes an inlet junction box having an inlet junction box housing defining an inlet front opening and a plurality of inlet male power contacts extending from the inlet junction box housing into the inlet front opening. The inlet junction box further includes a plurality of inlet female power contacts with one inlet female power contact being in electrical communication with a corresponding one of the male power contacts, and wherein each inlet female power contact is accessible at a back surface of the inlet junction box housing opposite the inlet front opening.

The cable management system further includes an outlet junction box having an outlet junction box housing defining an outlet front opening and a plurality of outlet female power sockets accessible through the outlet front opening. The system further includes a power bridge cable having a plurality of conductive wires having outlet and inlet ends. A permanent electrical connection is provided between the outlet end of each one of the plurality of conductive wires and a corresponding one of the plurality of outlet female power sockets. Furthermore, a power bridge plug is connected to an inlet end of the power bridge cable.

The power bridge plug includes a plurality of male power bridge contacts extending from the power bridge plug; and a permanent electrical connection between the inlet end of each one of the plurality of conductive wires and a corresponding one of the plurality of male power bridge contacts. In addition, the male power bridge contacts are shaped and configured to be removably inserted into electrical communication with the plurality of inlet female power contacts at the inlet junction box, thereby placing each one of the inlet male power contacts into electrical communication with a corresponding one of the plurality of outlet female power sockets.

Cable management system embodiments may include a clip system having one or more clip elements attached to the power bridge plug and one or more mating clip elements attached to the back surface of the inlet junction box. When present, the mating clips provide for secure attachment of the power bridge plug to the back surface of the inlet junction box when the male power bridge contacts are inserted into electrical communication with the plurality of inlet female power contacts.

Cable management system embodiments may also include a power bridge plug cover configured to removably fit over the power bridge plug. The power bridge plug cover may have a pull loop located at a distal end of the power bridge plug cover opposite the power bridge cable when the power bridge plug cover is placed over the power bridge plug and/or tapered sidewalls between the pull loop and a proximal end of the power bridge plug cover. The foregoing structures facilitate pulling the power bridge plug cover and attached power bridge plug and cable through the interior of a wall.

In some embodiments of cable management system, the plurality of inlet male power contacts and the plurality of outlet female power sockets are configured and shaped according to the requirements of a public electrical standard or code. Furthermore, the plurality of inlet female power contacts and the male power bridge contacts may be configured and/or shaped according to a non-standardized plug pattern.

The cable management system may also include audio/visual cable openings through the outlet junction box housing and the inlet junction box housing. Alternative embodiments include specific junction box embodiments, specific power bridge cable embodiments, specific plug cover embodiments, cable management methods, or cable management system installation methods.

DETAILED DESCRIPTION

Figure 1:
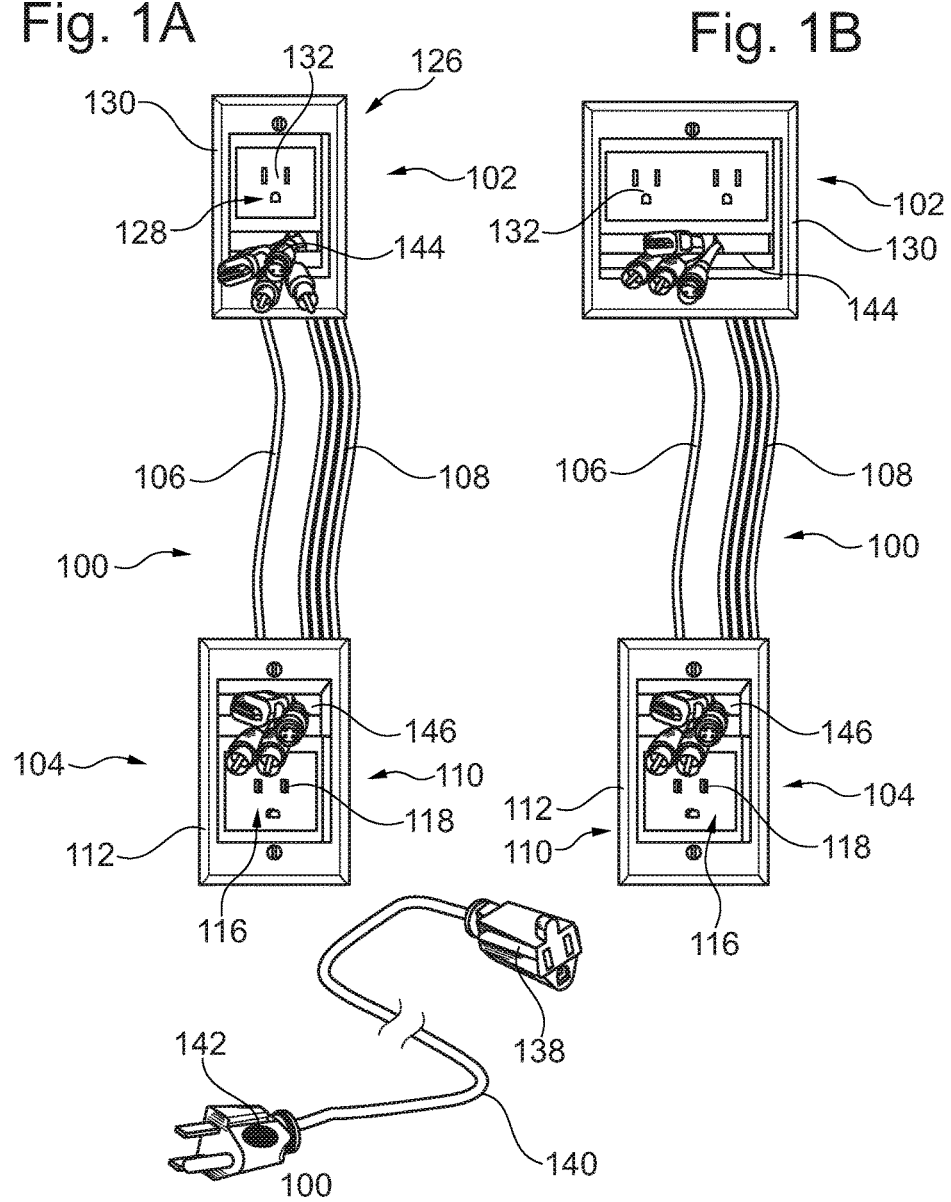
FIG. 1A is a front elevation view of a cable management system.
FIG. 1B is a front elevation view of an alternative cable management system.

A cable management system embodiment 100 is illustrated in FIG. 1A. The cable management system embodiment 100 includes an outlet junction box 102, an inlet junction box 104, and a power bridge cable 106 extending between the outlet and inlet junction boxes. The outlet junction box 102 may alternatively be referred to as the "upper" box because of the more typical location of the outlet box. Similarly, the inlet junction box 104 may be referred to as the "lower" box because of its more typical, but nonlimiting location. In some embodiments, the relative position of an inlet or outlet box, for example, as an upper or lower box may be switched. Alternatively, the inlet and outlet boxes may be placed at approximately the same height in other installations. The following disclosure is intended to cover the described structural elements in any configuration or orientation. In use, the outlet junction box 102 is mounted to an opening through a wall at a location where the outlet junction box 102 will be hidden from view by any type of wall-mounted appliance including, but not limited to, a flat-panel television, a computer monitor, an electronic fireplace or similar devices, collectively referred to herein as "an appliance".

The inlet junction box 104 will typically be mounted at an opening through the wall below the outlet junction box 102, a short distance above the floor or in any other desired and typically unobtrusive position. The power bridge cable 106 is configured to extend between the outlet and inlet junction boxes within the wall to which the junction boxes are attached. For example, the power bridge cable 106 may extend behind the drywall surface to which the appliance is mounted adjacent to the framing studs or other interior structural materials of the wall. Although the cable management system 100 can be used for new construction, certain features of the cable management system 100 make it particularly well-suited for retrofitting existing construction having existing walls, as described in detail below.

The cable management system 100 is configured to convey electric power from a wall outlet to the appliance. The electric power will typically be AC current having well-defined characteristics, for example 120 V/60 Hz AC current in the United States. Other cabling may extend to or from an appliance, including but not limited to audiovisual cable, data cable or the like. These other cables may also extend between the outlet junction box 102 and the inlet junction box 104. This additional cabling is collectively referred to as audiovisual cabling 108.

FIGS. 2-5 illustrate in more detail an inlet junction box 104. In particular, the embodiment of inlet junction box 104 illustrated in these figures includes a housing 110. When mounted, the inlet junction box 104 has housing portions which are mounted against the outside surface of the wall and portions which extend into the wall through an opening. In particular, the housing 110 has a flange 112 that in use extends adjacent to the exterior surface of the wall to which the inlet junction box 104 is attached. Other elements such as mounting clips 114 may be included to aid in attaching the inlet junction box 104 to the opening cut through a portion of the wall so that the portions of the housing 110 opposite the flange 112 extend into the wall.

The inlet junction box defines a front opening 116 extending from the flange 112 into the wall. The front opening 116 is accessible by a user at all times, including after the inlet junction box 104 is attached to a wall. As is perhaps best shown in FIG. 1A, the inlet junction box 104 also includes a plurality of male power contacts 118 extending from a rearward portion of the housing 110 into the front opening 116. In the specific embodiment illustrated in FIGS. 2 and 3, the male power contacts 118 extend from a back cover 120 through a faceplate 122, although this particular configuration is not limiting.

The inlet junction box 104 also includes one or more female power contacts 124, with each one of the female power contacts 124 being in electrical communication with a corresponding one of the male power contacts 118. In the specific embodiment shown in FIGS. 2 and 3, each female power contact 124 is fabricated from the same metallic conductive element as the corresponding male power contact 118. In alternative embodiments, each female power contact 124 may be a separate element electrically connected to the corresponding male power contact 118, with a wire, for example. Each female power contact 124 is accessible through one or more sockets or openings through the housing 110 on the back side, away from the flange 112 and opposite the front opening 116.

System embodiments, including the system 100, will also include an outlet junction box 102 which, as shown on FIGS. 1A and 1B, includes a housing 126 defining an outlet front opening 128. The housing 126 of the outlet junction box will also typically include a flange 130, mounting clips (not shown) and/or other structures as are required to mount the outlet junction box 102 to an opening through a wall such that the outlet front opening 128 extends into the wall. The outlet junction box 102 will include one or more female power sockets 132. The outlet junction box 102 embodiment of FIG. 1A includes one set of female power sockets 132, whereas the embodiment of FIG. 1B includes two sets of female power sockets 132. Alternative embodiments can include any desired number of female power sockets.

The system 100 also includes a power bridge cable 106 configured to extend within the wall from the outlet junction box 102 to the inlet junction box 104. In particular, the power bridge cable 106 will include a plurality of conductive wires having a gauge sufficient to carry the voltage and current necessary to power the television or other appliances mounted or positioned near the outlet junction box 102. One end of each of the conductive wires will be attached to a corresponding conductive element of the female power socket(s) 132. Typically, the conductive wires of the power bridge cable 106 will be attached to the corresponding conductive elements of the female power socket(s) 132 with a permanent electrical connection such as a solder connection, weld, crimp or the like. The connection between the ends of the conductive wires and the conductive elements of the female power socket(s) 132 will be made through or at the housing behind or below the outlet front opening 128. Thus, the power bridge cable 106 extends from the outlet junction box 102 behind the flange 130, and therefore, when the outlet junction box 102 is installed to an opening in a wall, the power bridge cable 106 can extend within the wall. Furthermore, the electrical connection between the conductive wires of the power bridge cable 106 and the conductive elements of the female power socket(s) 132 causes any television or other appliance plugged into the female power socket(s) 132 to be placed into electrical communication with the power bridge cable 106.

The power bridge cable 106 terminates at the end opposite the female power socket(s) 132 in a power bridge plug 134. Any desired length of cable may extend between the power bridge plug 134 and the connection to the female power socket(s) 132. The power bridge cable 106 may include any suitable number of conductive wires. The power bridge plug 134 includes a plurality of male power bridge contacts 136 extending from the body of the power bridge plug 134. Each of the male power bridge contacts 136 is electrically connected with a solder joint, weld, crimp or other means to one of the conductive wires within the power bridge cable 106. In addition, each of the male power bridge contacts 136 is shaped and configured to be removably inserted, plug-in fashion, into electrical communication with a corresponding one of the female power contacts 124 at the inlet junction box 104.

Figure 3:
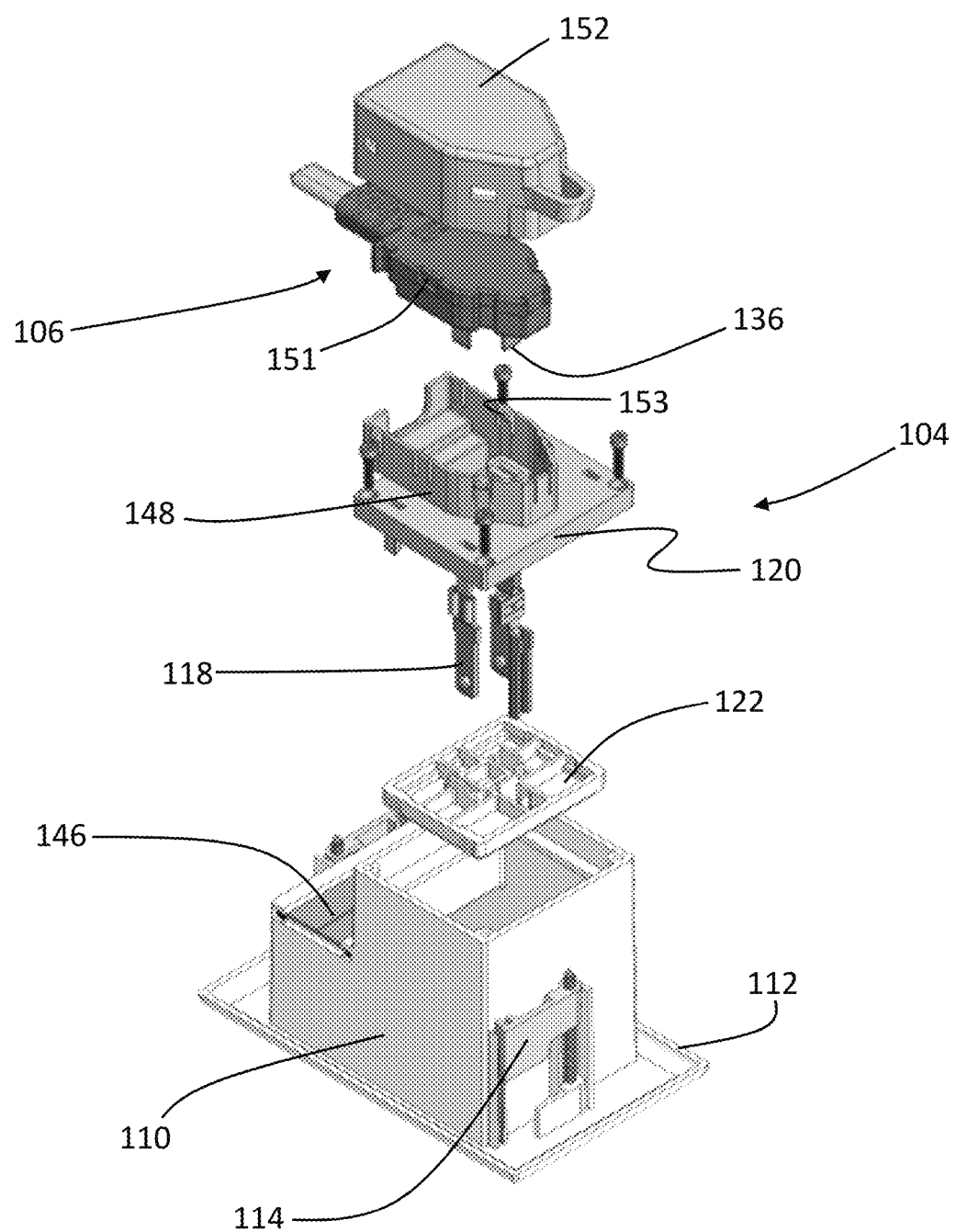
FIG. 3 is an alternative exploded isometric view of the inlet junction box of FIG. 2.
Figure 4:
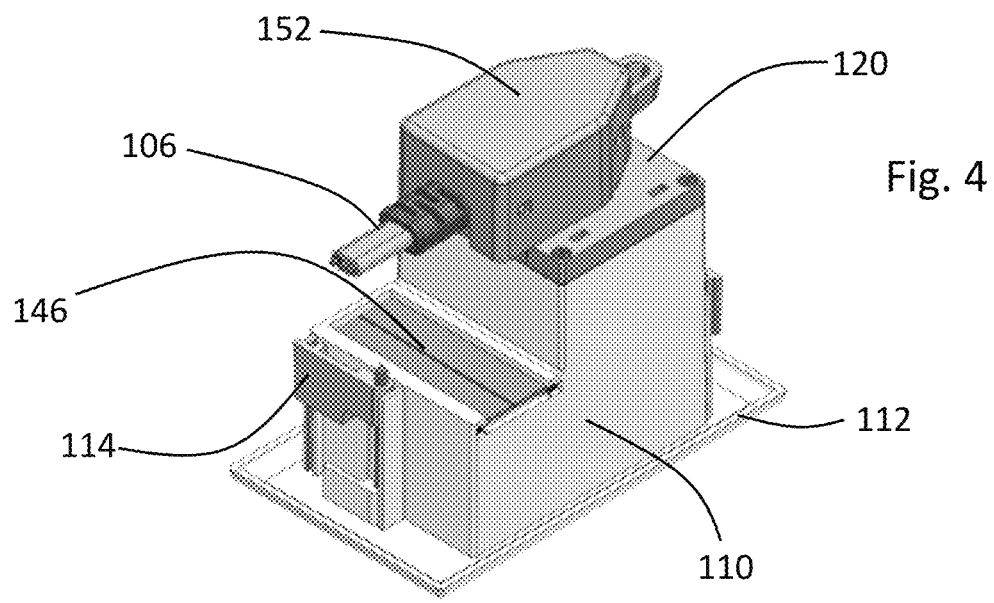
FIG. 4 is an isometric view of the inlet junction box of FIG. 2.

Thus, as best shown in FIGS. 3 and 4, the power bridge plug 134 can be plugged into the back of the housing 110 of the inlet junction box 104 which causes electrical contact to be made between the male power bridge contacts 136 and the female power contacts 124 of the inlet junction box. As noted above, the female power contacts 124 are in electrical communication with the inlet male power contacts 118 extending from the inlet front opening 116. Furthermore, the conductive wires of the power bridge cable 106 are in electrical contact with the outlet female power socket(s) 132. Therefore, when the power bridge plug 134 is attached to the inlet junction box 104, uninterrupted electrical contact is made from the inlet male power contacts 118 to the female power socket(s) 132.

Typically, the inlet male power contacts 118 and the female power socket(s) 132 will both be shaped and configured to conform to an electrical standard. For example, systems 100 configured for use in North America may have inlet male power contacts 118 and female power socket(s) 132 shaped and configured to conform to the NEMA 1-15 or NEMA 5-15 standards. Systems 100 configured for use elsewhere in the world may have inlet male power contacts 118 and female power socket(s) 132 shaped and configured to conform to applicable local standards. The embodiments disclosed herein are not limited to any particular electrical standard.

Standardized inlet male power contacts 118 and female power socket(s) 132 are advantageous because in use, a television or other appliance power cord will be plugged into a female power socket 132. In addition, the female end 138 of a typical extension cord 140 may be plugged over the male power contacts 118. Then, the male end 142 of the extension cord 140 may be plugged into a convenient wall outlet or power strip. Therefore, when all of the above connections are made, power can be supplied from the wall outlet through the various elements of the cable management system 100 to the television or other appliance mounted over or near the outlet junction box 102.

As noted above, it is advantageous for the inlet male power contacts 118 and female power socket(s) 132 to be shaped and configured to conform to applicable local standards. The male power bridge plug contacts 136 and the corresponding female power contacts 124 of the inlet junction box may optionally be configured and shaped according to a non-standardized pattern. The use of a non-standardized connection pattern or non-standardized connector sizes at power bridge plug interface may be advantageous to prevent tampering, or the connection of inappropriate apparatus to the female contacts at the back of the inlet junction box 104.

Each of the outlet junction box 102 and inlet junction box 104 may, optionally, include an audiovisual cable opening 144 and 146 respectively through the relevant housing. As shown in FIGS. 1A and 1B, audiovisual cables 108, data cables or other cables may extend from the outlet front opening 144 through the outlet housing 126 into the wall and then to the inlet junction box 104. At the inlet junction box 104, the audiovisual cables 108 may extend from the wall, through the audiovisual cable opening 146 to an accessible position within the inlet front opening 116.

As best illustrated in FIG. 3, the housing 110 of the inlet junction box 104, or alternatively, separate elements of the housing 110 (for example back cover 120) may be shaped to provide for the secure attachment of the power bridge cable plug 134 to the inlet junction box 104. In the FIG. 3 embodiment, the back cover 120 includes perimeter molding 148 shaped to secure the power bridge cable plug 134 and prevent inadvertent removal. Alternatively, or in addition to the perimeter molding 148, the power bridge cable plug 134 and the back cover 120 or another portion of the housing 110 may include clip structures 151 on the power bridge plug 134 and mating clip structures 153 on the back cover 120 to secure or supplementally secure the power bridge cable plug 134. Clip structures 151 and 153, when provided, also serve to prevent inadvertent removal of the power bridge cable plug 134 once it has been attached to the inlet junction box 104.

Figure 2:
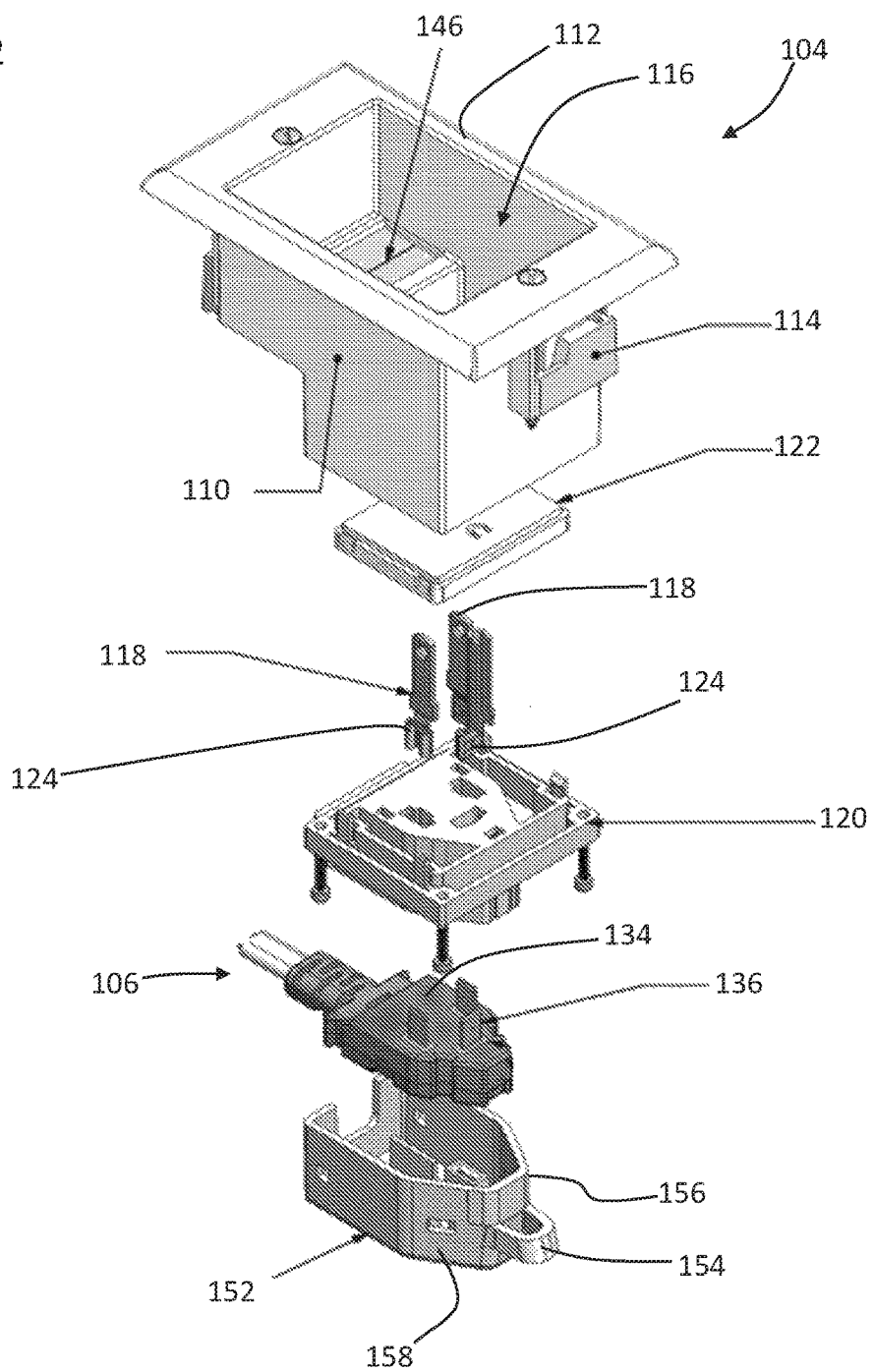
FIG. 2 is an exploded isometric view of an inlet junction box and associated apparatus.

As noted above, when used in an existing-construction implementation, the power bridge cable plug 134 and associated cable must be pulled through an interior space of the relevant wall from the outlet junction box location to the inlet junction box location. Pulling the power bridge cable plug 134 and attached cabling through the wall can be facilitated with a separate, optionally disposable, power bridge plug cover 152. As shown in FIGS. 2 and 3, one embodiment of power bridge plug cover 152 is shaped to conform substantially to the exterior surface of the power bridge cable plug 134. Prior to use, the power bridge plug cover 152 may be snapped or otherwise attached to the power bridge cable plug 134. The power bridge plug cover 152 and the power bridge cable plug 134 may include snaps, clips, pins, dummy electrical sockets 155, or other structures which serve to hold these elements together while not entirely preventing removal of the power bridge plug cover 152 after the assembly has been pulled through the wall to the location of the inlet junction box. As may be noted by comparison of FIG. 3 with FIGS. 7 and 8, the power bridge cover 152 may be attached to the side of the power bridge plug 134 having male power bridge contacts 136, or to the opposite side, away from the male power bridge contacts 136.

The power bridge plug cover 152 may include a pull loop 154 at a distal end 156 opposite the attachment between the power bridge cable 106 and the power bridge cable plug 134. Furthermore, the distal end 156 of the power bridge plug cover 152 may have tapered sidewalls 158 or other structures which serve to promote or facilitate the passage of the power bridge plug cover 152 and connected power bridge cable plug 134 through the wall and through any insulation or other material contained within the wall.

Figure 5:
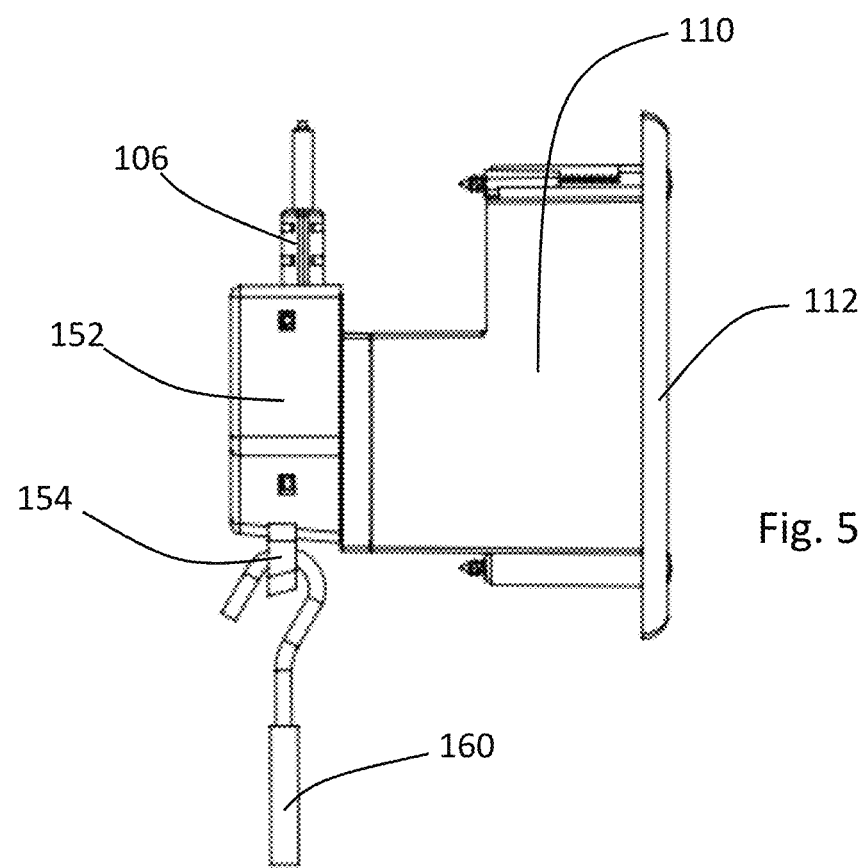
FIG. 5 is a side elevation view of the inlet junction box of FIG. 2.

As shown in FIG. 5, the pull loop 154 of the power bridge plug cover 152 may be connected to a fish tape 160, hook, string, wire, or other apparatus to facilitate pulling the power bridge plug 134, cover 152 and cable 106 assembly through the wall. After the power bridge plug, cover and cable assembly is pulled from the location of the outlet junction box 102 to the location of the inlet junction box 104, the plug cover 152 may optionally be removed and the power bridge plug 134 attached to the inlet junction box 104. Alternatively, the plug cover 152 may remain attached to the power bridge cable plug 134 when the power bridge cable plug is attached to the inlet junction box 104. In such an embodiment, the plug cover 152 may include tabs, clips, pins, sockets or other structures which securely attach the plug cover 152 and associated power bridge cable plug 134 to corresponding structures of the inlet junction box, for example the perimeter molding 148. In an embodiment where the plug cover 152 remains attached to the system after installation, the plug cover 152 may additionally serve as a protective cover over the power bridge plug interface.

Optionally, audiovisual cables 108 may be pulled between the openings 104 and 106. Then, the outlet and inlet junction boxes 102 and 104 may be attached to the wall as described above completing installation.

Figure 6:
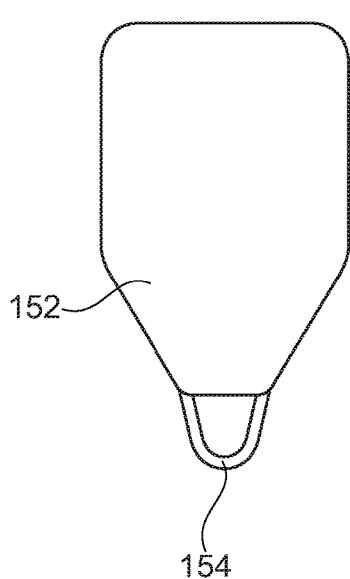
FIG. 6 is a plan view of a power bridge plug cover.
Figure 7:
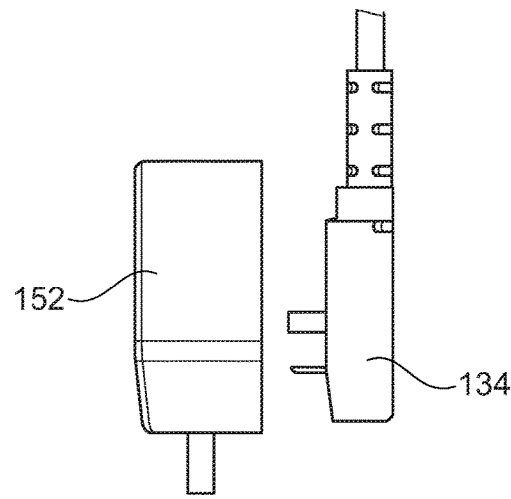
FIG. 7 a side elevation view of the power bridge plug cover of FIG. 6 and an associated power bridge plug.
Figure 8:
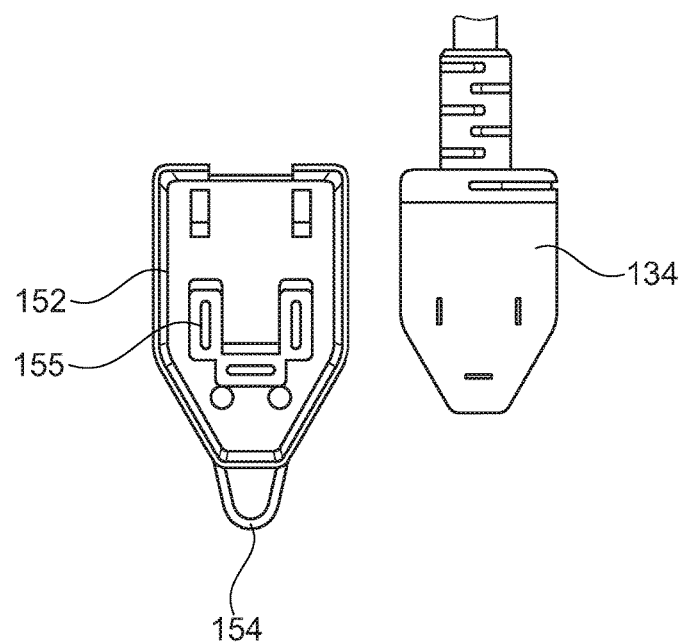
FIG. 8 is a plan view of the power bridge plug cover and associated power bridge plug of FIG. 7.

Additional structural details of the power bridge cable 106, power bridge cable plug 134, power bridge plug cover 152, and other system elements are shown in FIGS. 6-8.

Additional embodiments disclosed herein include, but are not limited to, each junction box as described herein, a power bridge cable as described herein, and a power bridge plug cover as described herein. Other embodiments include a cable management method and/or a cable management system installation method utilizing any combination of elements described herein.

In this application and the claims, the use of the singular includes the plural unless specifically stated otherwise. In addition, use of "or" means "and/or" unless stated otherwise. Moreover, the use of the term "including", as well as other forms, such as "includes" and "included", is not limiting. Also, terms such as "element" or "component" encompass both elements and components comprising one unit and elements and components that comprise more than one unit unless specifically stated otherwise.

Various embodiments of the disclosure could also include permutations of the various elements recited in the claims as if each dependent claim was a multiple dependent claim incorporating the limitations of each of the preceding dependent claims as well as the independent claims. Such permutations are expressly within the scope of this disclosure. While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims. All references cited herein are incorporated in their entirety by reference.

What is claimed is:

1. A cable management system comprising:
    an inlet junction box comprising;
        an inlet junction box housing defining an inlet front opening;
        a plurality of inlet male power contacts extending from the inlet junction box housing into the inlet front opening;
        a plurality of inlet female power contacts with one inlet female power contact being in electrical communication with a corresponding one of the inlet male power contacts, and wherein each inlet female power contact is accessible at a back surface of the inlet junction box housing opposite the inlet front opening;
    an outlet junction box comprising;
        an outlet junction box housing defining an outlet front opening; and
        a plurality of outlet female power sockets accessible through the outlet front opening; and
    a power bridge cable comprising;
        a plurality of conductive wires having outlet and inlet ends;
        a permanent electrical connection between the outlet end of each one of the plurality of conductive wires and a corresponding one of the plurality of outlet female power sockets;
        a power bridge plug connected to an inlet end of the power bridge cable;
        a plurality of male power bridge contacts extending from the power bridge plug; and
        a permanent electrical connection between the inlet end of each one of the plurality of conductive wires and a corresponding one of the plurality of male power bridge contacts, wherein the male power bridge contacts are shaped and configured to be removably inserted into electrical communication with the plurality of inlet female power contacts at the inlet junction box, thereby placing each one of the inlet male power contacts into electrical communication with a corresponding one of the plurality of outlet female power sockets.

2. The cable management system of claim 1 further comprising a clip system having one or more clip elements attached to the power bridge plug and one or more mating clip elements attached to the back surface of the inlet junction box, providing for secure attachment of the power bridge plug to the back surface of the inlet junction box when the male power bridge contacts are inserted into electrical communication with the plurality of inlet female power contacts.

3. The cable management system of claim 1 further comprising a power bridge plug cover configured to removably fit over the power bridge plug.

4. The cable management system of claim 3 wherein the power bridge plug cover further comprises a pull loop located at a distal end of the power bridge plug cover opposite the power bridge cable when the power bridge plug cover is placed over the power bridge plug.

5. The cable management system of claim 4 wherein the power bridge plug cover comprises one or more dummy electrical sockets to receive one or more of the male power bridge contacts.

6. The cable management system of claim 3 wherein the power bridge plug cover comprises tapered sidewalls between the pull loop and a proximal end of the power bridge plug cover.

7. The cable management system of claim 1 wherein:
the plurality of inlet male power contacts and the plurality of outlet female power sockets are configured and shaped according to the requirements of a public electrical standard; and
the plurality of inlet female power contacts and the male power bridge contacts are configured and shaped according to a non-standardized pattern.

8. The cable management system of claim 1 further comprising audio/visual cable openings through the outlet junction box housing and the inlet junction box housing.

9. A cable management method comprising:
providing an inlet junction box comprising;
an inlet junction box housing defining an inlet front opening;
a plurality of inlet male power contacts extending from the inlet junction box housing into the inlet front opening;
a plurality of inlet female power contacts with one inlet female power contact being in electrical communication with a corresponding one of the male power contacts, and wherein each inlet female power contact is accessible at a back surface of the inlet junction box housing opposite the inlet front opening;
providing an outlet junction box comprising;
an outlet junction box housing defining an outlet front opening; and
a plurality of outlet female power sockets accessible through the outlet front opening;
providing a power bridge cable comprising;
a plurality of conductive wires having outlet and inlet ends;
a permanent electrical connection between the outlet end of each one of the plurality of conductive wires and a corresponding one of the plurality of outlet female power sockets;
a power bridge plug connected to an inlet end of the power bridge cable;
a plurality of male power bridge contacts extending from the power bridge plug; and
a permanent electrical connection between the inlet end of each one of the plurality of conductive wires and a corresponding one of the plurality of male power bridge contacts;
inserting the male power bridge contacts into electrical communication with the plurality of inlet female power contacts at the inlet junction box, thereby placing each one of the inlet male power contacts into electrical communication with a corresponding one of the plurality of outlet female power sockets.

10. The method of claim 9 further comprising securing attachment of the power bridge plug to the back surface of the inlet junction box when the male power bridge contacts are inserted into electrical communication with the plurality of inlet female power contacts with a clip system having one or more clip elements attached to the power bridge plug and mating clip elements attached to the back surface of the inlet junction box.

11. The method of claim 9 further comprising:
fitting a removable power bridge plug cover over the power bridge plug;
pulling the inlet end of the power bridge cable through a structure from a location of the outlet junction box to a location of the inlet junction box; and
removing the power bridge plug cover from the power bridge plug.

12. The method of claim 9 wherein the power bridge plug further comprising pulling the inlet end of the power bridge cable through structure by attaching a pulling element to a pull loop located at a distal end of the power bridge plug cover opposite the power bridge cable.

13. The method of claim 9 further comprising:
plugging the female socket of an extension cord over the plurality of inlet male power contacts;
inserting the male contacts of the extension cord into a wall outlet; and
plugging the male contacts of a device power cord into the outlet female power sockets.

14. The method of claim 9 further comprising:
providing audio/visual cable openings through the outlet junction box housing and the inlet junction box housing;
placing a first end of an audiovisual cable through the audio/visual cable opening of the outlet junction box housing; and
placing a second end of the audiovisual cable through the audio/visual cable opening of the inlet junction box housing.

* * * * *